(12) United States Patent
Verelst et al.

(10) Patent No.: US 7,621,016 B2
(45) Date of Patent: Nov. 24, 2009

(54) WIPER LEVER COMPRISING A WIPER ARM AND WIPER BLADE WHICH IS CONNECTED TO THE SAME IN AN ARTICULATED MANNER, FOR CLEANING WINDOWS, ESPECIALLY WINDOWS PERTAINING TO MOTOR VEHICLES

(75) Inventors: Hubert Verelst, Tienen (BE); Eric Windmolders, Kermt (BE); Christian Wilms, Beringen (BE); Hans Beelen, Herk de Stad (BE); Robert Vertongen, Sinterueiten (BE)

(73) Assignee: Robert Bosch GmbH, Stuttgart (DE)

( * ) Notice: Subject to any disclaimer, the term of this patent is extended or adjusted under 35 U.S.C. 154(b) by 691 days.

(21) Appl. No.: 10/523,910

(22) PCT Filed: Mar. 28, 2003

(86) PCT No.: PCT/DE03/01031

§ 371 (c)(1),
(2), (4) Date: Feb. 8, 2005

(87) PCT Pub. No.: WO03/084790

PCT Pub. Date: Oct. 16, 2003

(65) Prior Publication Data

US 2006/0021178 A1    Feb. 2, 2006

(30) Foreign Application Priority Data

| Apr. 4, 2002 | (DE) | ............................. 102 14 956 |
| Jul. 23, 2002 | (DE) | ............................. 102 33 531 |
| Aug. 8, 2002 | (DE) | ............................. 102 36 385 |
| Sep. 19, 2002 | (DE) | ............................. 102 43 662 |
| Dec. 12, 2002 | (DE) | ............................. 102 57 990 |

(51) Int. Cl.
*B60S 1/40* (2006.01)
*B60S 1/38* (2006.01)

(52) U.S. Cl. ............. 15/250.32; 15/250.43; 15/250.201

(58) Field of Classification Search .............. 15/250.32, 15/250.43, 250.44, 250.361, 250.201, 250.351
See application file for complete search history.

(56) References Cited

U.S. PATENT DOCUMENTS

| 3,874,018 A * | 4/1975 | Van Den Berg et al. .. 15/250.32 |
| 4,308,635 A * | 1/1982 | Maiocco ................... 15/250.32 |
| 6,305,066 B1 * | 10/2001 | De Paoli et al. ............... 29/450 |
| 2007/0094833 A1 * | 5/2007 | Poton ....................... 15/250.32 |

FOREIGN PATENT DOCUMENTS

DE    01 04 307    11/1898

(Continued)

*Primary Examiner*—Gary K Graham
(74) *Attorney, Agent, or Firm*—Michael Best & Friedrich LLP

(57) ABSTRACT

Wiper lever (10) with a driven wiper arm (12) and a wiper blade (14) linked to it for cleaning the windows of motor vehicles in particular, which is provided with a band-like, long-stretched-out, elastic supporting element (22) that is curved in the longitudinal direction over its band surfaces (26, 28), which features a rubber elastic wiper strip (30) that can be applied to the window on its concave curved band surface (26), on whose convex curved band surface (28) a coupling element (20) sits to connect the wiper blade to a coupling piece (18) of the wiper arm and the articulated connection is covered by a cap (100) that is held on the wiper blade. A well-designed, pleasing transition between the wiper arm and the wiper blade of the wiper lever along with good protection of the articulated connection that exists between these two components of the wiper lever are achieved without impairing the handling of the securing means in that this articulated connection has at its disposal means to secure the connection between the wiper arm (12) and the wiper blade (14) that can be actuated with at least one handle (80) and that the cap (100) accommodates the handle (80).

6 Claims, 8 Drawing Sheets

FOREIGN PATENT DOCUMENTS

| | | | |
|---|---|---|---|
| DE | 3222864 | * | 12/1983 |
| DE | 3619589 | * | 12/1987 |
| DE | 37 09 810 | | 10/1988 |
| DE | 198 60 644 | | 7/2000 |
| EP | 0158991 | * | 4/1985 |
| JP | 423555 | | 2/1992 |
| WO | WO 02 40329 | | 5/2002 |

* cited by examiner

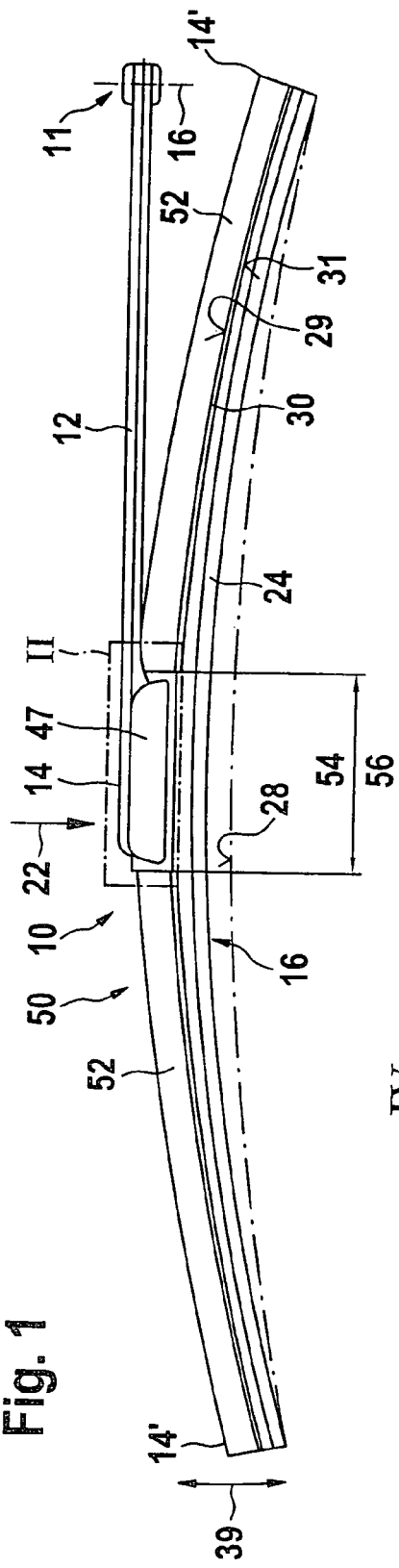
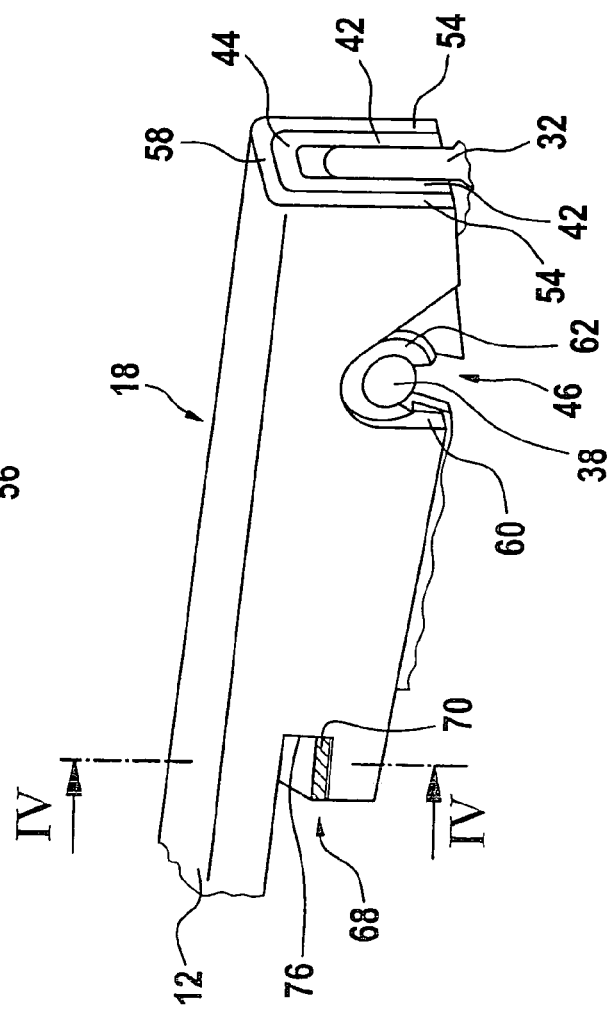

US 7,621,016 B2

WIPER LEVER COMPRISING A WIPER ARM AND WIPER BLADE WHICH IS CONNECTED TO THE SAME IN AN ARTICULATED MANNER, FOR CLEANING WINDOWS, ESPECIALLY WINDOWS PERTAINING TO MOTOR VEHICLES

BACKGROUND OF THE INVENTION

In the case of a known wiper lever of the type designated in the pre-characterizing clause of the independent claim (PCT/DE 0104307) a cap is supposed to protect the articulated connection in existence between the wiper arm and the wiper blade from environmental influences and produce an optically appealing transition from the wiper arm to the wiper blade. In addition, the cap is supposed to conceal edges and gaps that are produced in the transition area and thereby counteract the generation of undesired air stream noise. However, the smooth-running ability of the articulation should not be impaired in any way in the process. No references can be found there concerning the type and the structure of a connecting device, in particular concerning any securing means that are possibly present there and the manner of their actuation. It also remains open whether the cap must first be removed to possibly operate said securing means.

SUMMARY OF THE INVENTION

In the case of an arrangement in accordance with the invention, the cap accommodates the securing means present on the wiper lever including the handle in such a way that this handle lies ready for actuation at least within the contour of the cap. In addition, unintentionally actuating the accommodated securing means via the handle that has been thusly secured is practically excluded as long as the wiper lever encompassing the wiper arm and the wiper blade is in the operating position.

In a development of the invention, an adapter, which can be connected to the coupling piece of the wiper arm and is a part of the articulated connection, is linked to the coupling element of the wiper blade, on which adapter the handle for the securing means is arranged, wherein the embodiment of the cap permits the actuation of the securing means. Because of this measure, actuating the handle or the securing means located on the adapter on the wiper-blade side requires no special assembly steps, e.g., removing the cap in order to operate the handle.

In order to achieve an automatic effect of the securing means when attaching the wiper blade to the wiper arm, the adapter is composed of an elastic plastic, which has locking means that form the securing means, that can be actuated via the handle and that can be deflected against a restoring force transverse to the longitudinal extension of the supporting element in an at least almost parallel plane to its band width, which locking means cooperate with counter locking means embodied on the coupling piece of the wiper arm.

The cap is expediently embodied to be trough-like and faces the supporting element with its trough edge. The cap is provided with a penetration opening for the wiper arm, wherein the adapter is equipped with the handle projecting towards the longitudinal trough wall of the cap. Therefore, the projecting handle is easily recognizable as such and also simple to use.

With a specific embodiment of the articulated connection it is advantageous to provide the trough wall of the cap that is adjacent to the handle with a recess that is allocated to the handle, which recess simplifies the operation of the securing means via the handle.

An additional improvement in the optical effect and the operation of the securing means is achieved if the handle projects into the recess and thereby fills out this recess to a large extent.

A closed, optically pleasing embodiment of the arrangement in accordance with the invention is achieved if the trough wall of the cap that is adjacent to the handle is provided on its inner side with a groove-like indentation, which extends from the penetration opening to the trough edge and in addition the handle projects into this indentation.

An especially advantageous embodiment of the invention is yielded in that the trough wall of the cap manufactured of an elastic plastic that is adjacent to the handle features an elastically yielding area that is allocated to the handle. Operating the handle or the securing means of the connecting device is then possible in a simple manner via the deformation of the elastically yielding area.

A cost-effective embodiment of this elastically yielding area is achieved in accordance with an advantageous development of the invention in that this is formed by at least one slot-like break-through in the tough wall that partially encompasses this area.

In order to limit the elastic deformation of the trough wall required to actuate the securing means to the extent required for this, it has proven to be expedient if the elastically yielding area of the trough wall is provided with a support on its inner side that extends towards the handle.

An especially operationally reliable embodiment of the securing means is achieved in that the securing means feature two handles arranged at a distance from one another in their deflected direction, wherein the securing of the connection between the wiper arm and the wiper blade is detached in the deflected position of the handles when they approach one another.

To simplify assembly of the cap on the supporting element of the wiper blade, the cap is locked with the supporting element.

In an additional embodiment of the invention, the supporting element is provided with at least two limit stops each pointing in opposing longitudinal directions, to which corresponding counter limit stops of the cap are allocated. The assembly position of the cap on the wiper blade or on the supporting element is automatically defined as a result. A corresponding coordination of the limit stops and the counter limit stops with one another defines the position of the cap on the wiper blade in such a way that the handle of the securing means is situated at the position of the cap that is provided for this.

Additional advantageous further developments and embodiments of the inventions are disclosed in the following description of the exemplary embodiments depicted in the associated drawing.

BRIEF DESCRIPTION OF THE DRAWINGS

The drawing shows:

FIG. 1 The side view of a wiper lever in accordance with the invention.

FIG. 2 A perspective, enlarged detail designated by II in FIG. 1 depicting a device to connect a wiper blade with a wiper arm, without a cap.

DETAILED DESCRIPTION

Figure 3:
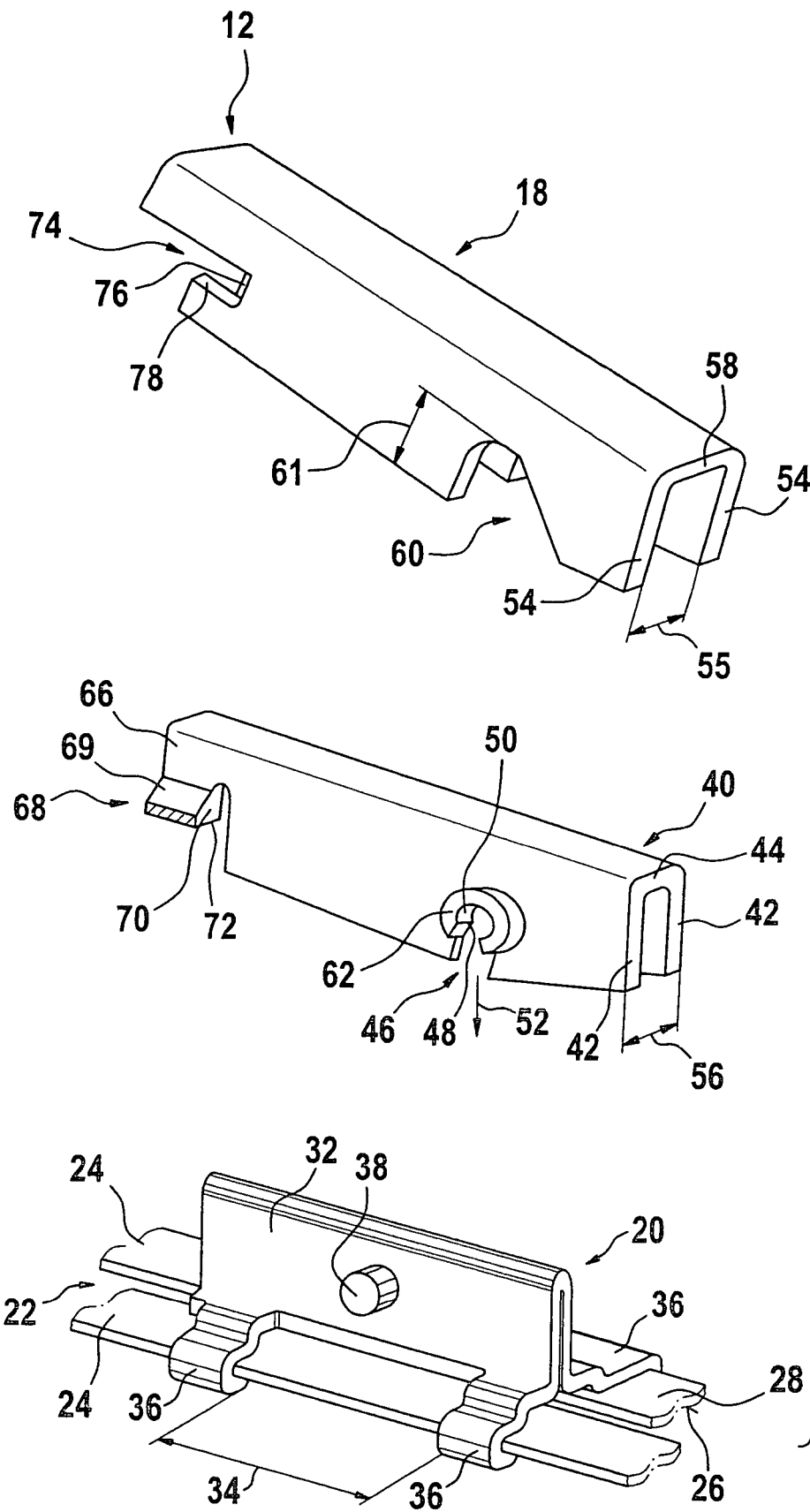
FIG. 3 An exploded representation of the arrangement in accordance with FIG. 2.

A wiper arm 12 and a wiper blade 14 linked to it are a part of a wiper lever 10 depicted in FIG. 1. The wiper arm 12 is driven in a pendulum fashion on its one end around an axis 16. In order to be able to produce the articulated connection between wiper arm and wiper blade in a simple manner, the wiper arm is provided with coupling piece 18 (FIGS. 2 and 3), on which the wiper blade 14 can be attached to a coupling element 20 via an adapter. The coupling element 20 is solidly connected to a supporting element 22, which in the exemplary embodiment has two spring rails 24 lying at a distance from one another in a common plane. The so formed, band-shaped, long-stretched-out supporting element 22 is curved in its longitudinal direction over its band surfaces 26 and 28. A rubber elastic wiper strip 30 that can be applied to the to-be-wiped window 15 is arranged on its concave curved band surface 26 and the coupling element 20 and as well as a spoiler 23 that supports the wiping work of the wiper blade sit on its other convex curved band surface 28. This arrangement is depicted in FIG. 3 without the wiper strip and spoiler. As can be seen in more detail there, the coupling element 20 has a longitudinal wall 32, which is solidly connected or welded with the spring rails 24 of the supporting element 22 via holding claws 36 situated at a distance 34 from one another in the longitudinal direction. An articulated pin 38, which is aligned transverse to the longitudinal direction of the longitudinal wall, projects from the longitudinal wall 32 of the coupling element 20 on both sides. FIG. 3 only shows the one articulated pin that is arranged on the side facing the observer, however. The axes of the two articulated pins 38 are aligned with one another. In addition, the aforementioned adapter 40 (FIG. 3), which is manufactured of an elastic plastic, is also a part of the wiper blade. The adapter 40 essentially has a U-shaped cross-section, whose two U-legs 42 extend from the U-base 44 to the supporting element 22. The distance between the two U-legs 42 is coordinated with the thickness of the longitudinal wall 32 in such a way that it can be accommodated with little play between the two legs (FIG. 2). To make this possible, the two U-legs are provided with receptacle slots 46 that are open-edged towards their free ends, each of which transitions to bearing receptacles 50 for the articulated pins 38 via a narrowing 48 (FIG. 3). As a result, it is possible to lock the adapter 40 captively with the coupling part 20, because the narrowing 48 permits the articulated pins to arrive in their bearing receptacles 50 during the temporary elastic expansion of the narrowing 48 that occurs when locking the adapter 40 on the coupling element 20 in the direction of arrow 52, thereby preventing the adapter from being detached from the articulated pins 38. The adapter 40 is thereby held in a captive manner on the coupling element 20 or on its articulated pins 38 so that it can move in a pendulum fashion around the longitudinal axis of the articulated pins 38. The wiper blade 14 can now be connected in a simple manner to the coupling piece 18 with the aid of this adapter 40 that is a part of the wiper blade 14. The coupling piece 18 of the wiper arm 12 also features a U-shaped cross-section, which is dimensioned in such a way that side walls 54 that serve as guide walls for the wiper blade are situated at a distance 55 from one another that is appropriately coordinated with the width 56 of the adapter 40. The U-base wall 58 of the coupling piece 18 forms a covering for the articulated connection in a practical way (FIG. 2). In order to be able to connect the coupling piece 18 of the wiper arm 12 properly with the adapter 40 and thus with the wiper blade 14, the U-side walls 54 of the coupling piece are provided with recesses 60 that are open-edged towards the free ends of the side walls 54. In order to improve the bearing function and the stability of the adapter, the two bearing receptacles 50 in the U-legs 42 of the adapter 40 are equipped with collar-like projections 62, which extend away from the U-legs 42 and widen the bearing receptacles 50 including the narrowings 48. The recesses 60 are used to accommodate the projections 62 when the wiper lever is assembled. Coordination between the collar-like projections 62 and the depth 61 of the recesses 60 is accomplished in such a way that the lowest possible play is possible (in the direction of the height extension of the side walls 54) when the coupling piece 18 covers the adapter 40 in the position depicted in FIG. 2. Known securing means (not shown) are attached in the area of the fore part of the legs 42 or in the area of the recess 60 and these securing means also fasten the wiper arm 12 on the adapter 40. In order to secure the articulated connection that is obtained in this manner between the wiper arm 12 and the wiper 14, the wiper lever 10 is provided with securing means, which, in the exemplary embodiment, are arranged on the side of the articulated connection facing the pendulum axis 16 (related to the axis of the articulated pins 38). On the wiper-blade side, the securing means include extensions 66 arranged on at least one of the two U-legs 42 of the adapter, on each of which extensions a locking tooth 68 is arranged (located exposed behind the longitudinal wall 32). Each of the locking teeth 68 extends from its extension 66 to the outside towards its adjacent side wall 54 of the coupling piece 18. It is provided with a locking shoulder 70 facing the articulated pin 38. In addition, each extension 66 or each locking tooth 68 also has a securing shoulder 72, which points away from the U-base 44 of the adapter 40 (FIG. 3). The embodiment of the extensions 66 is accomplished in such a way that, as a continuation of the U-leg 42 projecting beyond the longitudinal wall 32, they lie at a distance from one another and are elastically deflectable towards each other against a restoring force. These securing means on the wiper-blade side are assigned to securing means on the wiper-arm side. These are embodied on the coupling piece 18 of the wiper arm 12. As FIG. 3 in particular shows, a locking recess 74 is provided on each of the two end areas of the side walls 54 facing the pendulum axis 16, on which locking recess a counter locking shoulder 76 cooperating with the locking shoulder 70 and a counter securing shoulder 78 cooperating with the securing shoulder 72 are embodied (FIGS. 2 and 3).

Figure 4:
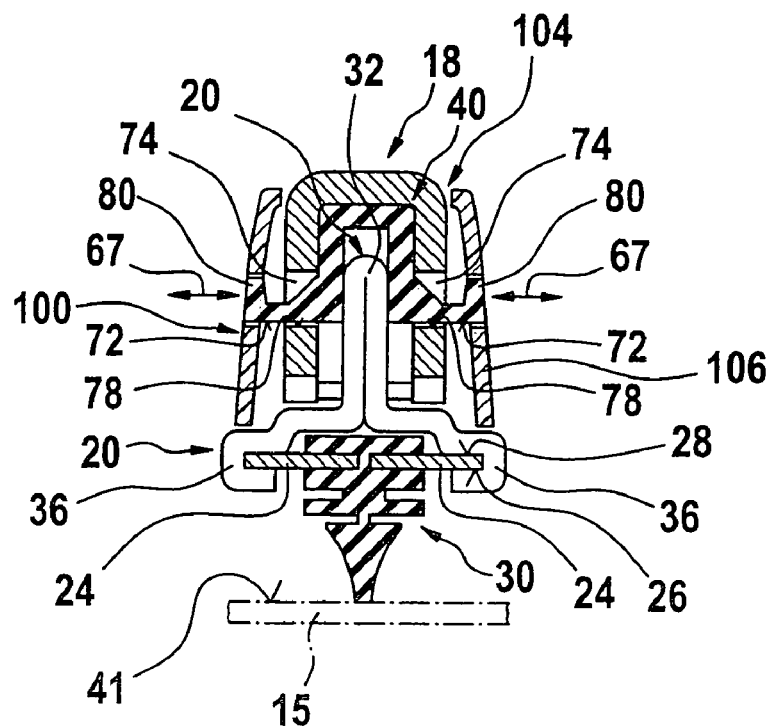
FIG. 4 A section along Line IV-IV in FIGS. 2 and 5 with the section leading through the entire wiper blade.

For the articulated connection of the wiper blade 14 with the wiper arm 12, the adapter 40 is first connected in an articulated manner with the coupling element 20 in the locking direction (arrow 52, FIG. 3). The finished assembly of the wiper blade 14 is thereby achieved practically. Coordination between the coupling element 20 and the adapter 40 is accomplished in this case so that the adapter can move in a pendulum fashion by a certain extent around the longitudinal axis of the two articulated pins 38. Afterwards, the connection of the wiper blade to the coupling piece 18 of the wiper arm 12 takes place. To do so, the wiper blade with its adapter 40 is inserted between the two side walls 54 of the coupling piece 18 in such a way that the collar-like projections 62 of the bearing receptacles 50 reach into the recesses 60 that are adapted to the contour of these projections. At the same time, the locking teeth 68 with the starting bevels 69 embodied on them hit on the free ends of the side walls 54 of the coupling piece 18 so that they are deflected towards each other against a restoring force in the one direction of the double arrow 67 until they reach into the locking recesses 74 in the side walls 54 and spring back there into their initial positions under the effect of the restoring force. In this assembly position that is then achieved and depicted in FIGS. 2 and 4, the locking shoulders 70 cooperate in such a way with the counter locking shoulders 76 and the securing shoulders 72 with the counter securing shoulders 78 that and unintentional detachment of the wiper blade from the wiper arm is precluded. In order to facilitate the assembly of the wiper blade on the wiper arm, it can be expedient if the outside cheeks (facing away from each other) of the U-legs 42 of the adapter 40 are provided with several glide ribs (not shown), which assume the support between the side walls 54 of the coupling piece 18 and the U-legs 42 of the adapter 40. To detach the wiper blade from the wiper arm, the locking teeth 68 must be deflected towards one another far enough that the locking shoulders 70 and the securing shoulders 72 disengage from the counter locking shoulders 76 and the counter securing means 78. For greater ease of operation, the locking teeth 68 are each provided with a handle 80 (FIG. 4, but omitted from FIGS. 2 and 3 in order to provide a better overview), which extends transverse to the longitudinal extension or in the movement direction (double arrow 67) of the extensions 66 (FIG. 4). The locking teeth 68 located on the extensions 66 therefore form with their locking shoulders 70 and securing shoulders 72 the securing means on the wiper-blade side, which are deflectable against a restoring force transverse to the longitudinal extension of the supporting element 22 in a plane parallel to its band width and which cooperate with counter locking means 74, 76, 78 embodied on the coupling piece 18. When the wiper blade 14 is connected to the wiper arm 12 in the manner described above and secured against unintentional detachment via the securing means, it can oscillate around the longitudinal axis of the articulated pins 38 in the direction of the double arrow 39 (FIG. 1) because of the articulated connection between the adapter 40 and the coupling element 20.

As FIG. 1 also shows, the to-be-wiped surface of the window or the surface 17 of the windshield 15 of a motor vehicle is curved. Since the curvature of the window surface 17 shown in FIG. 1 is supposed to represent the greatest curvature of the mostly spherically curved window surface, it is clearly evident that the curvature of the as yet unstressed wiper blade 14, whose two ends 14' are adjacent to the window surface, is greater than the maximum curvature of the window. Under an application force exerted by the wiper arm 12 acting in the direction of the arrow 11 (FIG. 1), the wiper blade applies its rubber-elastic wiper strip 30, arranged on the concave curved band surface 26 of the supporting element 22, over its entire length to the window surface 17. In doing so, tension builds up in the elastic supporting element 22 manufactured of metal and this tension is responsible for a proper application of the wiper strip over its entire length on the window as well as for a uniform distribution of the pressure force (arrow 11) caused by the application force. Moreover, the supporting element with its spring rails 24 is responsible for the required transverse stabilization of the rubber-elastic wiper strip 30. Because the window, which is spherically curved as a rule, does not represent a section of a spherical surface, the wiper blade must be able to constantly adapt vis-à-vis the wiper arm during its wiper operation to the respective position and the progression of the window surface. As a result, a smooth-running articulated connection is required between the wiper arm and the wiper blade that makes an oscillating movement (double arrow 39 in FIG. 1) around the articulated pin axis possible.

So that this articulated connection is protected against environmental influences, e.g., street dirt, snow, ice, etc., and the wiper lever also features a pleasing, appealing optical design in the transitional area between the wiper arm and the wiper blade, this articulated connection is covered by a cap held on the wiper blade, which features a passage embodied as an opening through which the wiper arm 12 grips to form the wiper lever with its coupling piece 18.

In order to guarantee simple assembly of the wiper lever and thus to also make it possible for a layman to change the wiper blade in an uncomplicated manner, the cap must be embodied correspondingly, taking the design and arrangement of the securing means into consideration as well as the embodiment of the associated handles. Three different embodiments of such a cap will be described in the following on the basis of FIGS. 5 though 7, 8 through 11 and 12 through 14.

Figure 5:
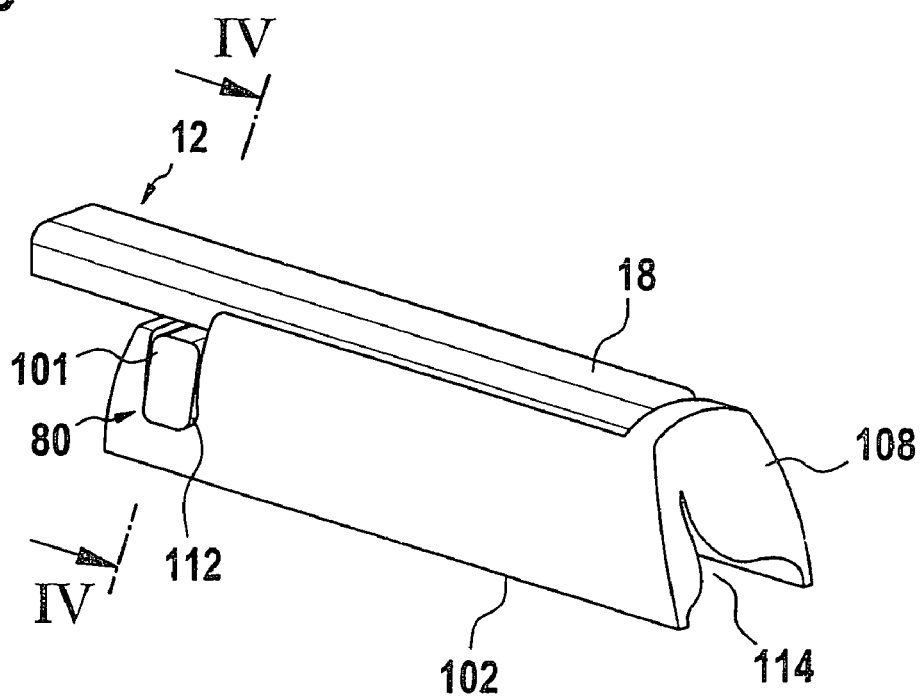
FIG. 5 The arrangement shown in FIG. 2 provided with a cap and a handle in a first operating position.
Figure 6:
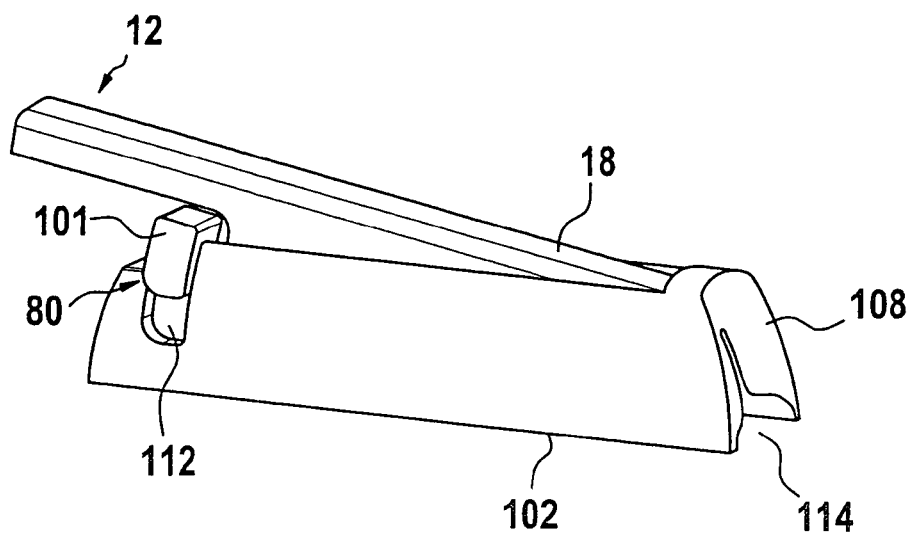
FIG. 6 The arrangement in accordance with FIG. 5 shown without a second operating position.
Figure 7:
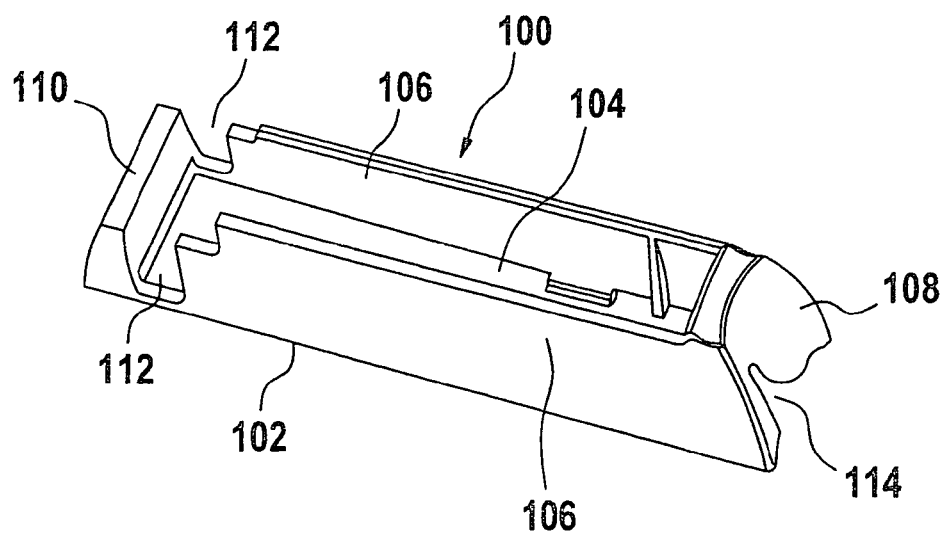
FIG. 7 A perspective representation of the cap belonging to the arrangement in accordance with FIGS. 2 through 6.

In the case of the embodiment in accordance with FIGS. 5 through 7, the securing means feature two handles 80, which are opposite from one another as seen transverse to the longitudinal extension of the wiper arm 12. FIG. 4 should also be observed for the arrangement and embodiment of the handles as well as for the arrangement of the cap on the wiper blade. The cap 100 has an essentially trough-like design (FIG. 7). The trough edge 102 of the cap is facing the supporting element 22 of the wiper blade 14 when the cap is mounted and is locked with it in the exemplary embodiment. FIG. 7 shows that the trough base of the cap 100 has been removed almost completely so that a passage or a penetration opening 104 is produced for the coupling piece 18 of the wiper arm 12. Therefore, the cap 100 has essentially two parallel longitudinal walls 106, which are connected to each other at their ends by a transverse wall 108 and a transverse strut 110. Near the transverse strut 110, the two longitudinal walls 106 are provided with recesses or formations 112 into which the handles 80 of the securing means project when the cap 100 is mounted on the wiper blade. This situation can be seen in FIGS. 4 through 6 and 7. Since the formations 112 are open-edged as seen from the penetration opening 104, the aforementioned oscillating movement (double arrow 39 in FIG. 1) of the wiper blade 14 is not restricted. This relative movement between the wiper arm 12 and the wiper blade 14 is substantiated in FIGS. 5 and 6 in which each of the two end positions of the oscillating movement (double arrow 39) is depicted (FIG. 1). FIGS. 4 through 7 show that the adapter is equipped with two opposing handles 80 projecting towards the cap and that each of the longitudinal or trough walls 106 of the cap 100 adjacent to the handles is provided with a recess 112 allocated to the related handle, into which recess the respective handle projects. Both handles 80 are easily accessible for operation and can be actuated in a simple manner by pressing them together simultaneously. With their end surfaces 101 they complete the outer trough wall surfaces so that no optically irritating recesses are produced (FIG. 5). Recesses 114 in the transverse wall 108 and in the transverse strut 110 make it possible to lead the spoiler partial section 23 though under the cap 100.

Figure 8:
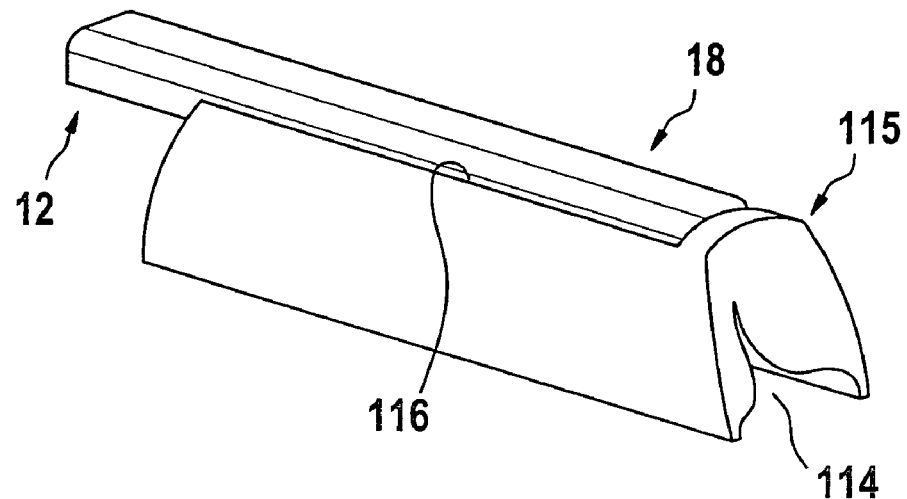
FIG. 8 Another connecting device provided with a cap in a first operating position.
Figure 9:
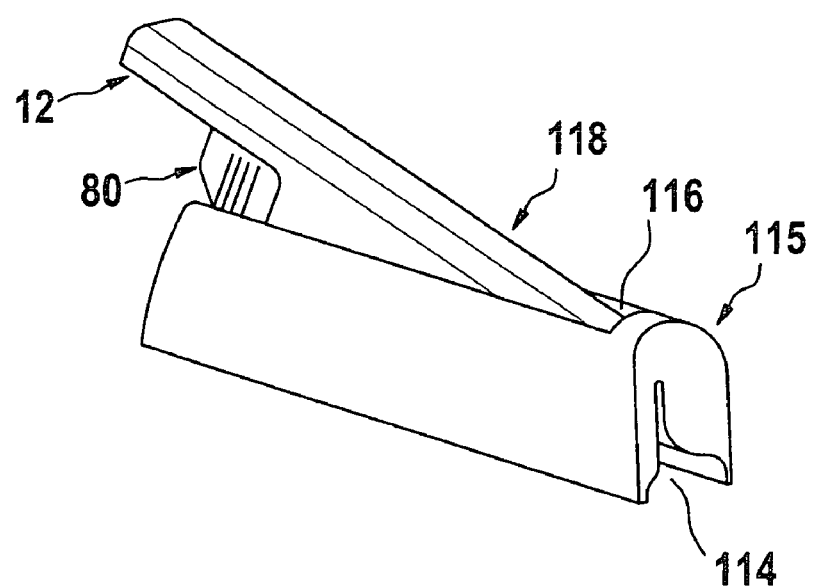
FIG. 9 The device in accordance with FIG. 8 in a second operating position.
Figure 10:
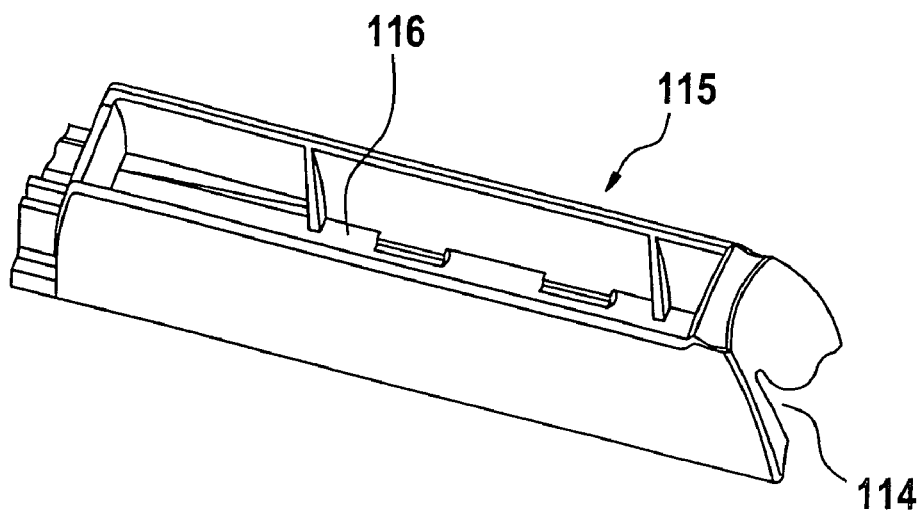
FIG. 10 The perspective representation of the cap belonging to the arrangement in accordance with FIGS. 8 and 9.

In the case of the embodiment in accordance with FIGS. 8 through 10, the handles 80 of the securing means are dimensioned in such a way that do not extend laterally or only insignificantly beyond the coupling piece 18 of the wiper arm 12. Thus, they dip through the penetration opening 116 completely into the cap 115 when it is in the final position of the wiper blade oscillation movement (double arrow 39 in FIG. 1), as shown in FIG. 8. In the other final position (FIG. 9), though the handles 80 are accessible, this position is only achieved temporarily during the wiping operation so that unintentional actuation of the handles 80 is precluded. The wiper blade can therefore only be detached from the wiper arm if the entire wiper device is at a standstill, the wiper arm is folded away from the window and the wiper blade has been swiveled manually vis-à-vis the wiper arm into the position shown in FIG. 9. Actuating the handles 80, whose positioning corresponds to the handles 80 in FIGS. 4 through 6, is then possible without special effort when observing this requirement.

Figure 11:
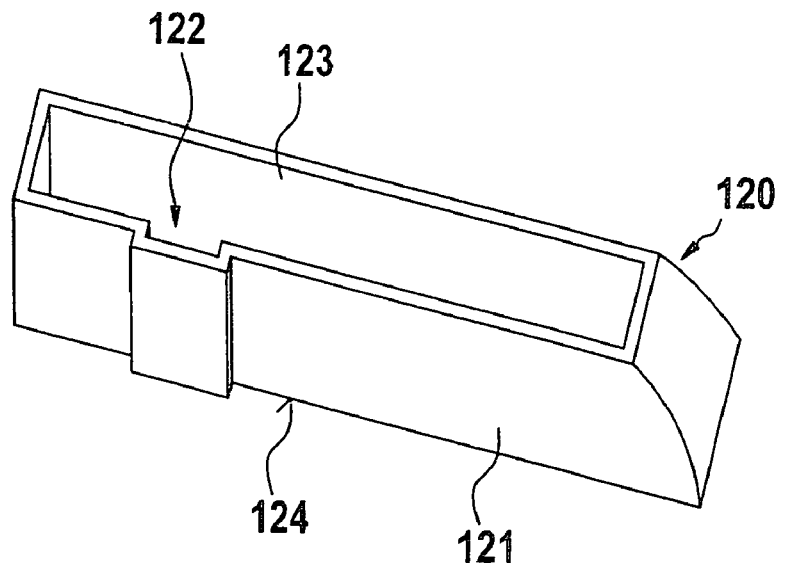
FIG. 11 Another embodiment of the cap in accordance with FIG. 10.

However, if for certain reasons an all-around closed cap 120 that completely covers the handles 80 (as illustrated in FIGS. 8 through 10) is supposed to be used for a wiper lever whose handles must project into the contour of the cap 130 for certain reasons, e.g., due to a greater ease of operation, it has proven to be advantageous if the trough wall 121 of the cap 120 adjacent to the handles is provided on its inner side with a groove-like indentation 122, which extends from the penetration opening 123 to the trough edge 124 so that the handle can project into this indentation (FIG. 11).

Figure 12:
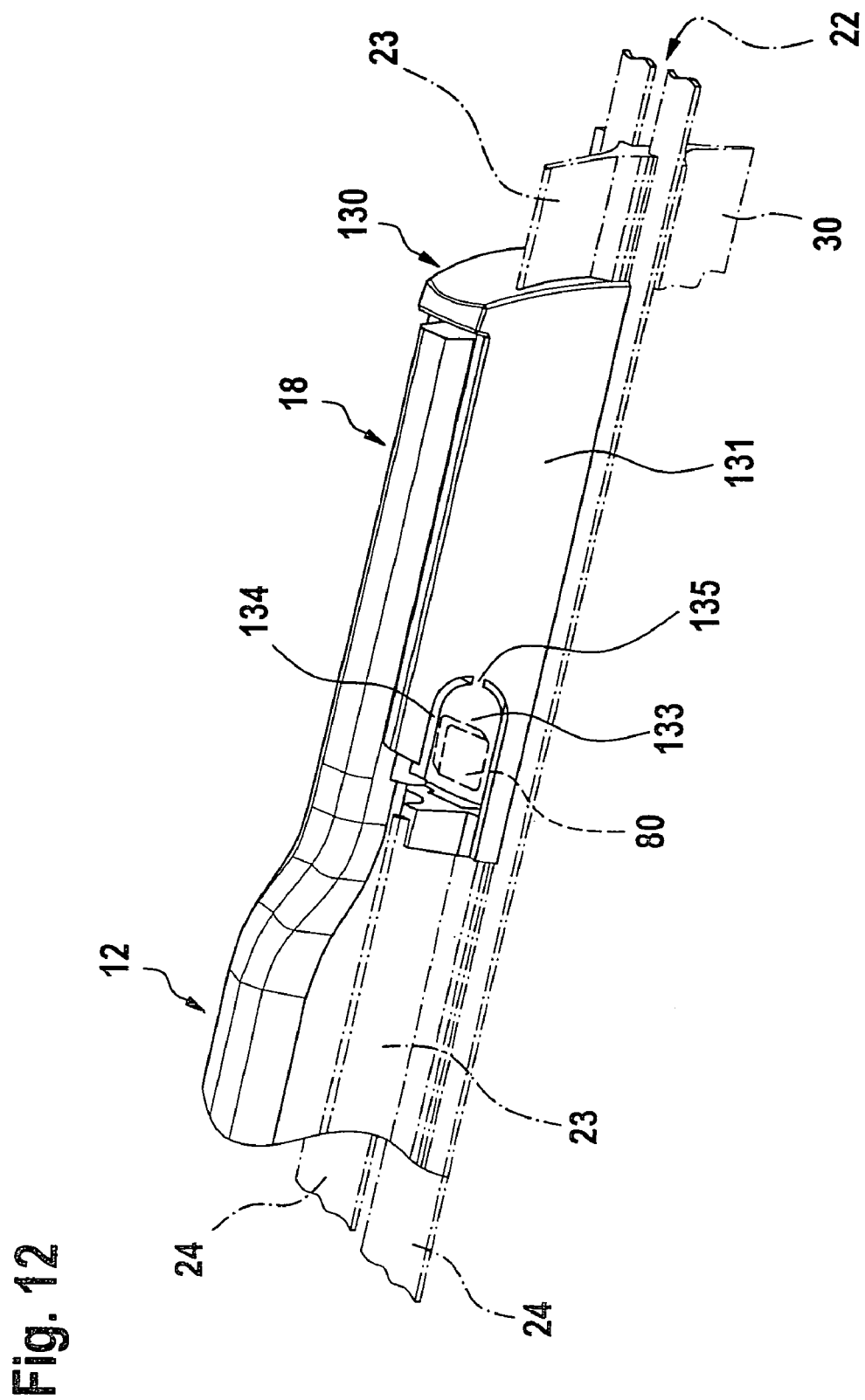
FIG. 12 Another connecting device provided with another cap in the wiper lever's operating position.
Figure 13:
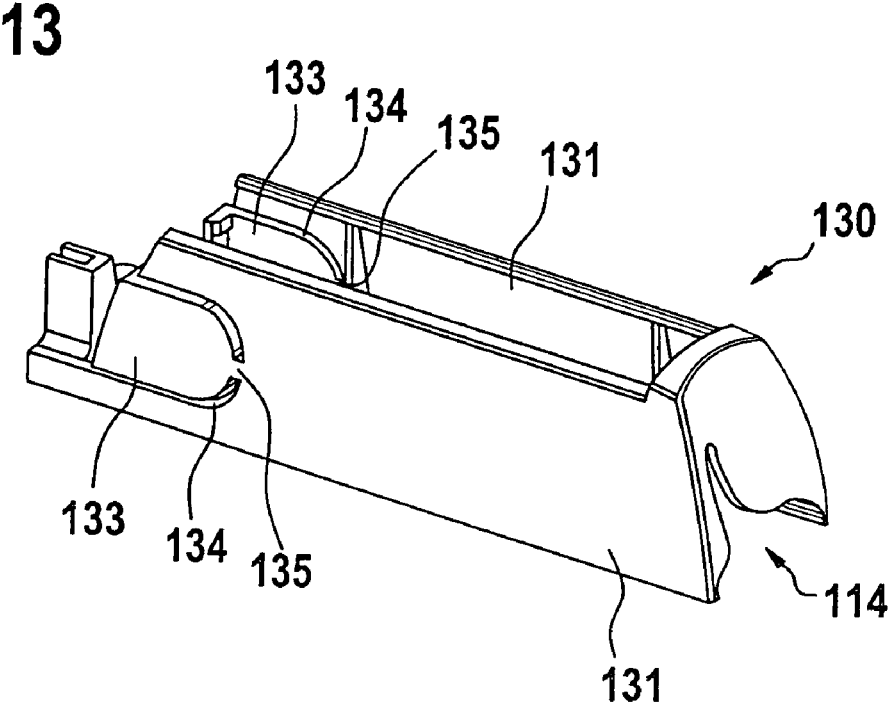
FIG. 13 A perspective representation viewed from above of the cap in accordance with FIG. 12.
Figure 14:
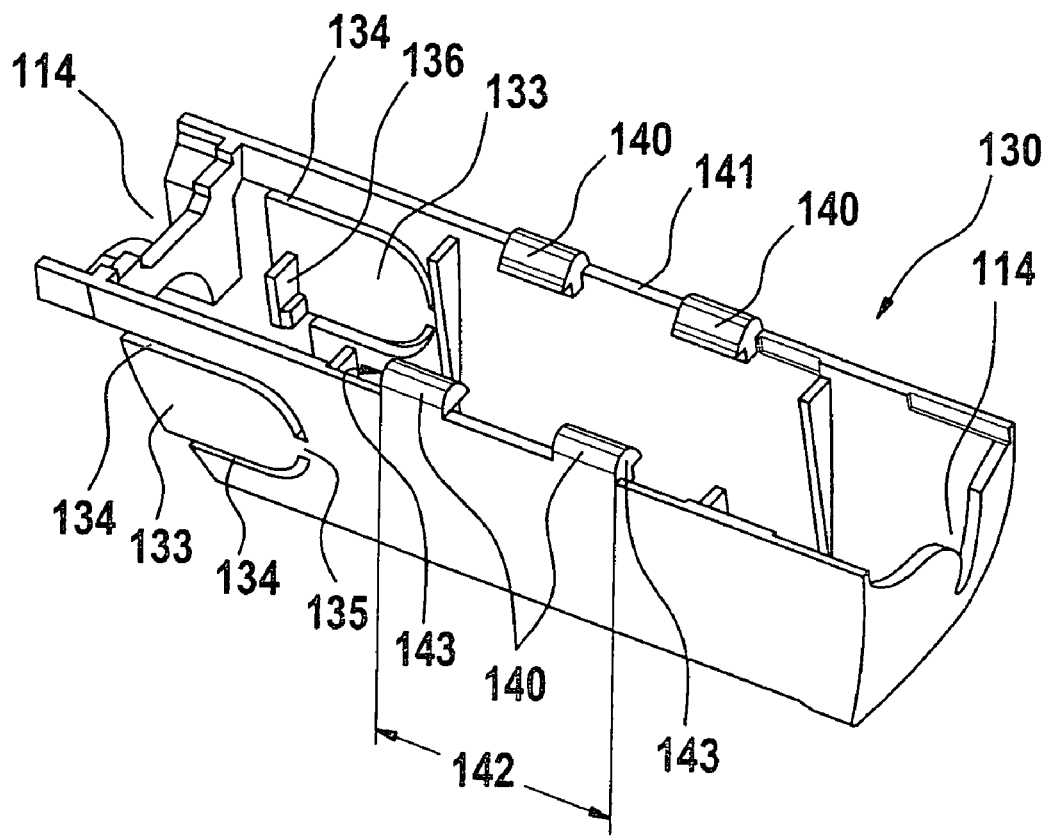
FIG. 14 A perspective representation viewed from below of the cap in accordance with FIGS. 12 and 13.

In the arrangement in accordance with FIGS. 12 through 14, the designs of the securing means and their handles correspond essentially to the embodiment according to FIGS. 8 through 10. Therefore, the longitudinal walls 131 of the cap 130 are not provided with passage recesses for the handles 80, because they do not project laterally or only insignificantly from the coupling piece 18 of the wiper arm 12. In this embodiment of the invention, each of the two longitudinal trough walls 131 is equipped with an elastically yielding area 133 in order to operate the handles 80 that are completely covered by the two sides. These two areas 133 are allocated to the handles 80, i.e., they are directly opposite from the handles 80 (FIG. 12). Since the caps 130 are manufactured of an elastic plastic, the yielding area 133 allocated to the handles 80 can be achieved in many ways. In the exemplary embodiment, slot-like break-throughs 134 that partially encompass these areas 133 are arranged in the trough walls 131. These break-throughs are embodied in such a way that the area is practically formed by a tongue, which is connected elastically with the remaining trough wall 131 via a connecting piece 135. In order to bridge a possible distance between the inner side of these tongues 133 and the surfaces of the handles facing them and thereby avoid a certain empty movement of the tongues, the yielding areas 133, i.e., the tongues, are each provided on their inner sides with a support 136 extending towards the handle 80 (FIG. 14).

FIG. 14 also shows the arrangement of four locking claws 140 on the trough wall 141 of the cap 130, which oppose one another in pairs. The distance 142 between the front sides 143 (pointing away from one another) of the holding claws 140 arranged on the same trough wall is coordinated in such a way with the dimension 34 between the claws 36 of the coupling element 20 (FIG. 3) that the locking claws 140 of the cap 130 form positioning aids in cooperation with the claws 36 of the coupling element 20, thereby simplifying assembly of the cap 130 on the wiper blade 14 or on the supporting element 22. The holding claws 36 of the coupling element 20 or their fore parts that face away from each another, therefore, form limit stops defined on the supporting element 22, which determine the assembly position of the cap on the supporting element in cooperation with the locking claws 140 of the cap 130 that form counter limit stops. Due to corresponding coordination of the distance dimension of the claws 36 to the handles 80 of the securing means (this dimension is fixed due to the position of the adapter 40 on the articulated pins 38), the dimension of the locking claws 140 of the cap 130 to the elastically yielding area 133 or to the tongues and thus the assembly position of the cap 130 on the wiper blade is clearly determined.

As FIGS. 1 and 12 show, the wiper blade 14 is provided with a wind deflector strip 23 (also called a spoiler) on the convex curved side 28 of the supporting element 22, which, however, must feature a longitudinal recess there where the coupling element 20 is connected to the supporting element 22. As a result, the transverse wall 108 is provided with a recess 114 adapted to the contour of the wind deflector strip, through which the spoiler can be guided until under the cap. The transverse strut 110 also features such a recess for the spoiler 23 so that a non-harmonious transition between the spoiler and the cap can be avoided.

It is clearly evident from the description of the various exemplary embodiments that the connecting device has means at its disposal that can be actuated with at least one handle to secure the connection between the wiper arm and the wiper blade and that the cap accommodates the handle in such way it does not appear to be optically irritating, and despite this is easily accessible while protected against unintentional actuation. The "accommodation" of the handle by the cap shall be understood such that it does not project over the contours of the cap. Therefore, purposeful action is required in order to actuate the securing means with the handle.

The invention claimed is:

1. Wiper lever (10) with a driven wiper arm (12) and a wiper blade (14) linked to it for cleaning the windows, which is provided with a band-like, elongated, elastic supporting element (22) that is curved in the longitudinal direction over its band surfaces (26, 28), which features a rubber elastic wiper strip (30) that can be applied to the window on its concave curved band surface (26), on whose convex curved band surface (28) a coupling element (20) sits to connect the wiper blade to a coupling piece (18) of the wiper arm and the articulated connection is covered by a cap (100) that is held on the wiper blade, characterized in that this articulated connection includes means to secure the connection between the wiper arm (12) and the wiper blade (14) that can be actuated with at least one handle (80) and that the cap (100) accommodates the handle (80), characterized in that an adapter (40), which can be connected to the coupling piece (18) of the wiper arm and is a part of the articulated connection, is linked to the coupling element (20) of the wiper blade, on which adapter the handle (80) for the securing means is arranged and that the embodiment of the cap (100) permits the actuation of the securing means, characterized in that the cap (100) is embodied to be trough-like with its trough edge (102) facing the supporting element (22), that the cap is provided with a penetration opening (104) for the wiper arm and that the adapter (40) is equipped with the handle (80) projecting towards the longitudinal trough wall (106) of the cap, characterized in that the trough wall (106) of the cap (100) that is adjacent to the handle (80) is provided with a recess (112) allocated to this handle, and characterized in that the handle (80) projects into this recess (112).

2. Wiper lever (10) with a driven wiper arm (12) and a wiper blade (14) linked to it for cleaning the windows, which is provided with a band-like, elongated, elastic supporting element (22) that is curved in the longitudinal direction over its band surfaces (26, 28), which features a rubber elastic wiper strip (30) that can be applied to the window on its concave curved band surface (26), on whose convex curved band surface (28) a coupling element (20) sits to connect the wiper blade to a coupling piece (18) of the wiper arm and the articulated connection is covered by a cap (100) that is held on the wiper blade, characterized in that this articulated connection includes means to secure the connection between the wiper arm (12) and the wiper blade (14) that can be actuated with at least one handle (80) and that the cap (100) accommodates the handle (80), characterized in that an adapter (40), which can be connected to the coupling piece (18) of the wiper arm and is a part of the articulated connection, is linked to the coupling element (20) of the wiper blade, on which adapter the handle (80) for the securing means is arranged and that the embodiment of the cap (100) permits the actuation of the securing means, characterized in that the cap (100) is embodied to be trough-like with its trough edge (102) facing the supporting element (22), that the cap is provided with a penetration opening (104) for the wiper arm and that the adapter (40) is equipped with the handle (80) projecting towards the longitudinal trough wall (106) of the cap, and characterized in that the trough wall (121) of the cap (120) that is adjacent to the handle is provided on its inner side with a groove-like indentation (122), which extends from a passage (123) to the trough edge (124) and that the handle (80) projects into this indentation (122).

3. Wiper lever (10) with a driven wiper arm (12) and a wiper blade (14) linked to it for cleaning the windows, which is provided with a band-like, elongated, elastic supporting element (22) that is curved in the longitudinal direction over its band surfaces (26, 28), which features a rubber elastic wiper strip (30) that can be applied to the window on its concave curved band surface (26), on whose convex curved band surface (28) a coupling element (20) sits to connect the wiper blade to a coupling piece (18) of the wiper arm and the articulated connection is covered by a cap (100) that is held on the wiper blade, characterized in that this articulated connection includes means to secure the connection between the wiper arm (12) and the wiper blade (14) that can be actuated with at least one handle (80) and that the cap (100) accommodates the handle (80), characterized in that an adapter (40), which can be connected to the coupling piece (18) of the wiper arm and is a part of the articulated connection, is linked to the coupling element (20) of the wiper blade, on which adapter the handle (80) for the securing means is arranged and that the embodiment of the cap (100) permits the actuation of the securing means, characterized in that the cap (100) is embodied to be trough-like with its trough edge (102) facing the supporting element (22), that the cap is provided with a penetration opening (104) for the wiper arm and that the adapter (40) is equipped with the handle (80) projecting towards the longitudinal trough wall (106) of the cap, characterized in that the trough wall (131) of the cap (130) manufactured of an elastic plastic that is adjacent to the handle (80) features an elastically yielding area (133) that is allocated to the handle, and characterized in that the elastically yielding area (133) is formed by at least one slot-like break-through (134) in the trough wall (131) that partially encompasses this area.

4. Wiper lever according to claim 3, characterized in that the elastically yielding area (133) of the trough wall (131) is provided with a support (136) on its inner side that extends towards the handle (80).

5. Wiper blade for cleaning windows with a band-like, elongated, elastic supporting element (22) that is curved in the longitudinal direction over its band surfaces (26, 28), on whose concave curved band surface (26) a rubber elastic wiper strip (30) is situated and on whose convex curved band surface (28) a coupling element (20) is arranged to connect the wiper blade (14) to a driven wiper arm (12) in an articulated manner, wherein the coupling element (20) is provided with an adapter (40), which features means to secure the wiper blade on the wiper arm, which can be moved from a locked position into an unlocked position in an actuation direction, wherein the coupling element (20) and its adapter (40) are covered by a cap (100) featuring a passage (104) for the wiper arm (12), the cap (100) permitting the actuation of the securing means, wherein the securing means includes a first projection and a second projection formed on one of the adapter (40) and the wiper arm (12) and a first recess and a second recess formed on the other of the adapter (40) and the wiper arm (12), the first projection and the second projection being respectively engageable in the first recess and the second recess in the locking position to secure the wiper blade (14) to the wiper arm (12), the cap (100) permitting actuation of the securing means to from the locking position to the release position, in which the first projection and the second projection are disengaged from the first recess and the second recess to such that the wiper blade (14) can be unsecured from the wiper arm (12), wherein the securing means includes a first handle (80) operable to move the first projection and a second handle (80) operable to move the second projection, the first handle (80) and the second handle (80) extending generally parallel to the actuation direction, wherein the cap (100) has a first cap wall and an opposed second cap wall, each cap wall defining a recess (112), the first handle (80) projecting into the recess (112) in the first cap wall, and the second handle (80) projecting into the recess (112) in the second cap wall such that the cap (100) permits actuation of the first handle (80) and the second handle (80).

6. Wiper blade for cleaning windows with a band-like, elongated, elastic supporting element (22) that is curved in the longitudinal direction over its band surfaces (26, 28), on whose concave curved band surface (26) a rubber elastic wiper strip (30) is situated and on whose convex curved band surface (28) a coupling element (20) is arranged to connect the wiper blade (14) to a driven wiper arm (12) in an articulated manner, wherein the coupling element (20) is provided with an adapter (40), which features means to secure the wiper blade on the wiper arm, which can be moved from a locked position into an unlocked position in an actuation direction, wherein the coupling element (20) and its adapter (40) are covered by a cap (100) featuring a passage (104) for the wiper arm (12), the cap (100) permitting the actuation of the securing means, wherein the securing means includes a first projection and a second projection formed on one of the adapter (40) and the wiper arm (12) and a first recess and a second recess formed on the other of the adapter (40) and the wiper arm (12), the first projection and the second projection being respectively engageable in the first recess and the second recess in the locking position to secure the wiper blade (14) to the wiper arm (12), the cap (100) permitting actuation of the securing means to from the locking position to the release position, in which the first projection and the second projection are disengaged from the first recess and the second recess to such that the wiper blade (14) can be unsecured from the wiper arm (12), wherein the securing means includes a first handle (80) operable to move the first projection and a second handle (80) operable to move the second projection, the first handle (80) and the second handle (80) extending generally parallel to the actuation direction, wherein the cap (100) has a first cap wall and an opposed second cap wall, each cap wall having an elastically yielding area (133) having a flexibility greater than an adjacent area of the cap wall, the first handle (80) being adjacent to the elastically yielding area (133) in the first cap wall, and the second handle (80) being adjacent to the elastically yielding area (133) in the second cap wall, each elastically yielding area (133) permitting actuation of an associated one of the first handle (80) and the second handle (80).

\* \* \* \* \*

UNITED STATES PATENT AND TRADEMARK OFFICE
CERTIFICATE OF CORRECTION

PATENT NO.      : 7,621,016 B2
APPLICATION NO. : 10/523910
DATED           : November 24, 2009
INVENTOR(S)     : Verelst et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1213 days.

Signed and Sealed this

Twenty-sixth Day of October, 2010

David J. Kappos
*Director of the United States Patent and Trademark Office*